June 26, 1962     A. W. McCLURE     3,040,972
CENTRIFUGAL COMPRESSOR
Filed April 6, 1959

INVENTOR.
ARTHUR W. McCLURE
BY *Holmes & Andersen*
ATTORNEYS

United States Patent Office 3,040,972
Patented June 26, 1962

3,040,972
CENTRIFUGAL COMPRESSOR
Arthur W. McClure, La Crosse, Wis., assignor to The Trane Company, La Crosse, Wis., a corporation of Wisconsin
Filed Apr. 6, 1959, Ser. No. 804,412
4 Claims. (Cl. 230—132)

This invention relates to centrifugal compressors. It has been more common heretofore to provide a shaft and bearing housing which is split on a plane axial of the impeller supporting shaft. With such a construction, very accurate machining and fitting of the parts is required to make the housing both oil and gas tight. Replacing or servicing bearings in a split housing can be difficult and time consuming operation.

The object of my invention is to provide a bearing housing which is not split on a plane through the axis of the shaft.

It is another object of the invention to provide a bearing structure which permits servicing or replacement of the bearings without removal of the impeller or the shaft from the compressor casing, and without the necessity of providing a large access opening in the circumferential wall of the housing.

It is still another object of the invention to arrange the radial bearings adjacent the impeller and the thrust bearing adjacent the drive end of the shaft so that the thrust bearing may be serviced or replaced while the shaft is supported on the radial bearings.

Other objects and advanatages of the invention will become apparent as the specification proceeds to describe the invention with reference to the accompanying drawings in which.

Figures 1, 2:
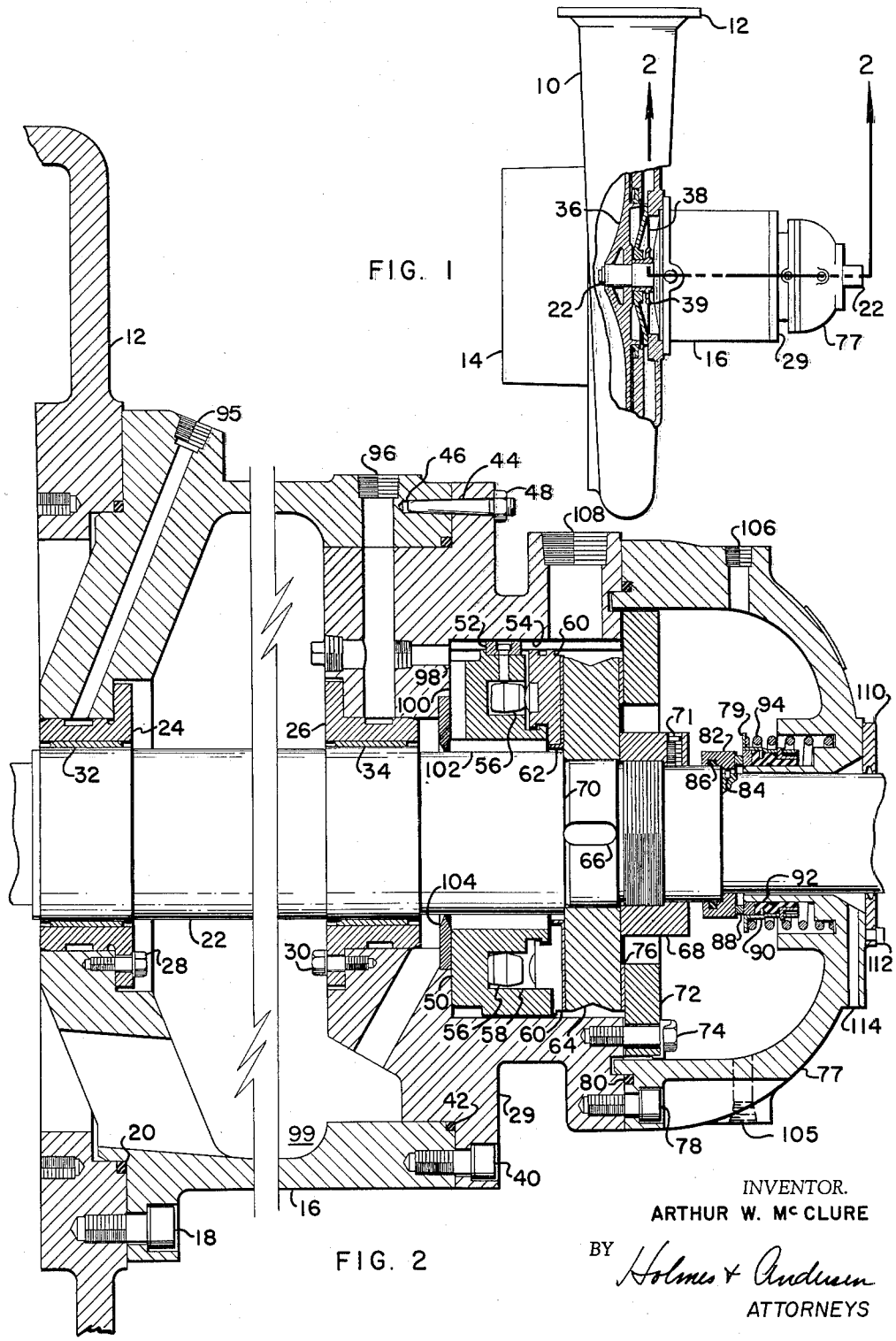
FIG. 1 is a plan view of the compressor with portions of the casing broken away to show the interior construction.
FIG. 2 is an enlarged sectional view taken on line 2—2 of FIG. 1.

Referring now to the drawings and particularly to FIG. 1, the compressor casing 10 has a discharge outlet 12. A gas inlet 14 conducts gas to the compressor casing 10. A bearing housing 16 is secured to the compressor casing 10 by bolts 18 and an O-ring 20 of "neoprene" or other suitable flexible material provides a sealed joint between the bearing housing 16 and the compressor casing 10. A shaft 22 is rotatably mounted in bearings 24 and 26. Bearing 24 is secured to the housing 16 by bolts 28 and bearing 26 is secured to cage 29 by bolts 30. Bearings 24 and 26 have integral bearing linings 32 and 34 respectively.

An impeller 36 is mounted on the shaft 22 to be driven thereby. A wall 38 separates the interior space of the compressor casing 10 from the interior space of the bearing housing 16. A slinger 39 is mounted on and rotates with the shaft 22. The wall 38 has a close fit around the slinger 39 to prevent any substantial flow of gas from the compressor casing 10 to the bearing housing 16.

Cage 29 is secured to the housing 16 by bolts 40 and an O-ring 42 of "neoprene" or other suitable flexible material provides a seal for the joint between the cage 29 and the housing 16. Two tapered pins 44 extend through the cage 29 into holes 46 in the bearing housing 16 to positively locate the cage 29 on the bearing housing 16. The pins 44 are spaced angularly about the axis of the cage 29. A nut 48 is threaded on the pin 44 and may be threaded inwardly on the pin 44 to force the pin 44 outwardly for removal. A thrust bearing of the pivoted shoe or "Kingsbury" type is mounted in the cage 29. Thrust bearings of other types may be used. A "Kingsbury" type bearing has been shown for purposes of illustration. The thrust bearing has a base ring 50 which is mounted on cage 29 and which is prevented from rotating by a key 52 engaging in a keyway 54. Leveling plates 56 are mounted in an annular groove 58 in the base ring 50. Shoes 60 are pivotally mounted on the leveling plates 56 and have a bearing lining 62 in bearing engagement with the thrust collar 64. The thrust collar 64 has a key (not shown) which engages with a keyway 66 in the shaft 22 to prevent relative rotation between the collar 64 and the shaft 22. A nut 68 is in threaded engagement with the shaft 22 and holds the thrust collar 64 against the shoulder 70 on the shaft 22. One or more set screws 71 in the nut 68 engages the shaft 22 and holds the nut 68 against rotation. A thrust plate 72 is secured by bolts 74 to the cage 29, and has a bearing lining 76 in bearing engagement with the thrust collar 64.

A seal cap 77 is secured by bolts 78 to the cage 29. A seal assembly indicated generally by numeral 79 is housed in the seal cap 77. An O-ring 80 of "neoprene" or other suitable flexible material provides a seal between the seal cap 78 and the cage 29.

A seal ring 82 is secured on the shaft 22 by a pin 84. An O-ring 86 of "neoprene" or other suitable flexible material seals the seal ring 82 to the shaft 22. A stationary seal member 88 is supported by a bracket 90 and by a synthetic elastic sleeve 92. A spring 94 acts against the bracket 90 to urge the stationary seal member 88 into sealing engagement with the seal ring 82.

Lubricating oil from a pressurized source (not shown) is supplied to the oil passageways 95 and 96 which conduct the oil to the bearing surfaces of bearings 24 and 26 respectively in a conventional manner. The oil from these bearings flows into a sump 99 from which it flows back to the source.

Oil to passageway 96 feeds oil to passageway 98. From passageway 98, the oil flows through passageways 100 and 102 to the bearing lining 62. A ring 104 prevents any substantial flow of oil from passageway 102 to the sump 99 in order that pressure may be maintained in passageway 102.

Lubricating oil from the pressurized source supplies oil to the passageway 105 to lubricate the contacting faces of seal ring 82 and seal member 88. A portion of the oil from passageway 105 flows outwardly along lining 76 and the remainder flows out through passageway 106 and back to the pressurized source. The oil flowing outwardly along the bearing linings 62 and 76, then flows through passageway 108 and back to the pressurized source.

A cover plate 110 is secured to the seal cap 77 by bolts 112 and closely fits the shaft 22 to prevent oil from running along the shaft in the event that seal 79 leaks oil. Any oil leaking past the seal will flow through passageway 114.

The parts have been arranged for ease of service. For instance, the seal assembly 79 is accessible by removing the seal cap 77. With the seal cap 77 removed, the parts of the thrust bearing are accessible. If the bearings 32 and 34 require repair or replacement, the cage 29 is also removed. When the bearings 32 and 34 are removed, the shaft 22 and the impeller 36 will be supported by the fit of slinger 39 in wall 38.

The pins 44 are provided to assure positive alignment and location of bearing support surfaces in housing 16 and cage 29. The manner in which these surfaces are machined will now be described. The housing 16 and the cage 29 are assembled to each other before the bearing support surfaces are finish machined. The tapered pins 44 are installed. Now the bearing support surfaces in the housing 16 and in the cage 29 are machined in a single setup with the same boring bar. It can thus be seen that the housing 16 and the cage 29 can be separated and reassembled without losing alignment of the bearing support surfaces. The pins 44 assure that the parts will be reassembled in the same relative positions.

Although I have described specifically a preferred embodiment of my invention, I contemplate that changes may be made without departing from the scope or spirit of my invention and I desire to be limited only by the claims.

I claim:

1. A centrifugal compressor comprising a casing, a housing secured to and extending outwardly from said casing, a first bearing in said housing, a shaft rotatably mounted in said first bearing and extending into said casing, an impeller in said casing, said impeller being mounted on said shaft, a cage secured to said housing and surrounding said shaft, a second bearing in said cage rotatably mounting said shaft, an annular thrust collar mounted on said shaft, thrust bearing means secured to said cage and engaging both sides of said thrust collar to support said shaft against relative movement with respect to said cage in a direction axial of said shaft, a cap secured to said cage, said cap surrounding said shaft and having an opening through which said shaft extends, and sealing means on said shaft and on said cap for sealing the opening between said shaft and said cap.

2. A centrifugal compressor comprising a casing, a substantially annular housing secured to and extending outwardly from said casing, a first bearing secured in said substantially annular housing, a shaft rotatably mounted in said first bearing and extending into said casing, an impeller in said casing, said impeller being mounted on said shaft, a substantially annular cage secured to said housing and surrounding said shaft, a tapered pin in engagement with said substantially annular cage and said substantially annular housing to hold said substantially annular cage and said substantially annular housing in fixed relative positions, a second bearing in said substantially annular cage rotatably mounting said shaft, an annular thrust collar mounted on said shaft, thrust bearing means on said substantially annular cage and engaging both sides of said thrust collar to support said shaft against relative movement with respect to said substantially annular cage in a direction axial of said shaft, a cap secured to said substantially annular cage, said cap surrounding said shaft and having an opening through which said shaft extends, and sealing means on said shaft and on said cap for sealing the opening between said shaft and said cap.

3. A centrifugal compressor comprising a casing, a housing secured to and extending outwardly from said casing, a first bearing in said housing, a shaft rotatably mounted in said first bearing and extending into said casing, an impeller in said casing, said impeller being mounted on said shaft, a cage secured to said housing and surrounding said shaft, a second bearing in said cage rotatably mounting said shaft, an annular thrust collar mounted on said shaft, thrust bearing means on said cage and engaging both sides of said thrust collar to support said shaft against relative movement with respect to said cage in a direction axial of said shaft, a cap secured to said cage, said cap surrounding said shaft and having an opening through which said shaft extends, sealing means on said shaft and on said cap for sealing the opening between said shaft and said cap, means forming a passageway through the wall of said cap for conducting lubricant to said seal and to said thrust collar, means forming a passageway through said cage for conducting lubricant to said thrust collar, and means forming a passageway through the wall of said cage for conducting lubricant from said thrust collar.

4. A centrifugal compressor comprising a casing, a housing secured to and extending outwardly from said casing, a first bearing in said housing, a shaft rotatably mounted in said first bearing and extending into said casing, an impeller in said casing, said impeller being mounted on said shaft, a cage secured to said housing and surrounding said shaft, an annular thrust collar mounted on said shaft, thrust bearing means on said cage and engaging both sides of said thrust collar to support said shaft against relative movement with respect to said cage in a direction axial of said shaft, a second bearing secured in said cage between said first bearing and said thrust bearing means, said second bearing rotatably supporting said shaft, a cap secured to said cage said cap surrounding said shaft and having an opening through which said shaft extends, and sealing means on said shaft and on said cap for sealing the opening between said shaft and said cap.

References Cited in the file of this patent

UNITED STATES PATENTS

| | | |
|---|---|---|
| 2,169,296 | Smith | Aug. 15, 1939 |
| 2,385,105 | Samelson | Sept. 18, 1945 |
| 2,721,105 | Schaefer | Oct. 18, 1955 |
| 2,820,681 | Audemar | Jan. 21, 1958 |
| 2,830,755 | Anderson | Apr. 15, 1958 |
| 2,854,927 | Berg | Oct. 7, 1958 |